Aug. 28, 1923.
C. LE G. FORTESCUE
1,466,277
PHASE BALANCER
Filed April 4, 1919
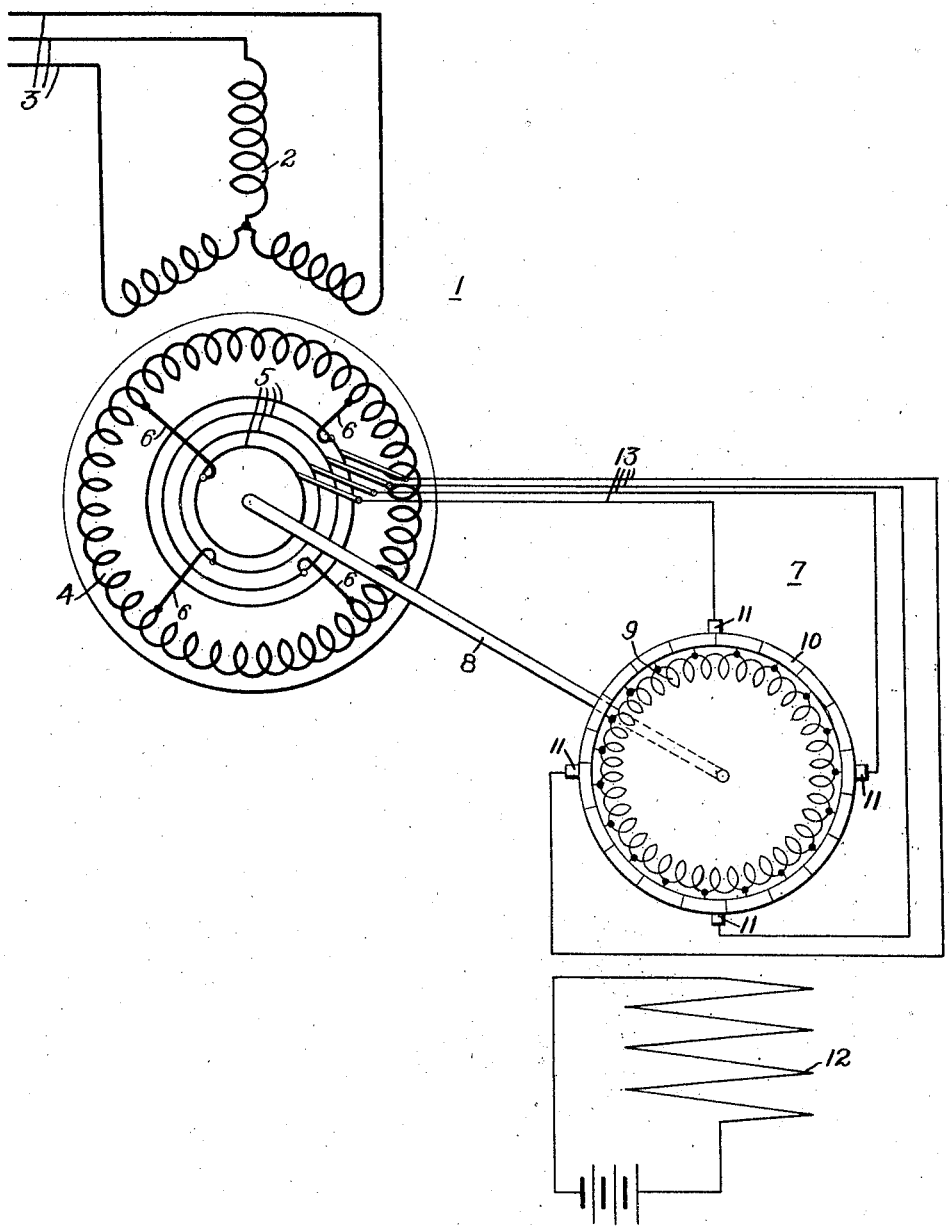
WITNESSES:
INVENTOR
Charles Le G. Fortescue.
BY
ATTORNEY Patented Aug. 28, 1923.

1,466,277

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE BALANCER.

Application filed April 4, 1919. Serial No. 287,609.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase Balancers, of which the following is a specification.

My invention relates to polyphase balancing systems, and it has particular relation to balancing systems, having means for providing paths of very low impedance for the circulating currents which tend to flow in the field windings of machines from which unbalanced-load currents are drawn.

It has heretofore been a more or less usual practice to provide the stator of a machine with heavy windings, usually known as damper windings, in which currents would flow in such manner as to so reduce the flux set up by the unbalanced currents flowing in the armature of the machine that a path of low impedance would be offered to these currents. However, there are difficulties attending the provision of such damping windings and, moreover, the application thereof to a dynamo-electric machine does not always offer the desired symmetrical path to the flow of circulating currents.

I propose, therefore, to so wind an auxiliary dynamo-electric machine which furnishes exciting currents to the field winding of the alternator, and so connect it thereto, that the machine shall perform substantially a double function, namely; it will furnish the required exciting current to the alternator and, at the same time, by the above-referred-to particular connection, it will offer a path of very low impedance to the circulating currents which flow in the field winding of the machine when that machine is furnishing unbalanced currents.

The manner in which I attain the above and other desirable objects will appear more fully hereinafter, and, for this purpose, reference may be had to the accompanying drawing, the single figure of which illustrates diagrammatically a dynamo-electric machine and an exciting machine connected thereto for the practice of my invention.

An alternating-current machine 1, having a stator winding 2 from which power is fed to a load through the mains 3—3, is provided with a rotating field winding 4. Slip rings 5—5 are connected to the winding 4 through suitable tap connections 6—6. For purposes of illustration, I will assume that the rotating field winding 4 is of the 2-pole type, and it will be observed, therefore, that there are twice as many equi-distant tapped points 6 as there are poles. The reason for this particular relation will hereinafter appear and it will suffice, at this time, therefore, to point out that, by the provision of the tapped connections and the commensurate number of slip rings, I have established a 2-phase winding upon the armature of the dynamo-electric machine and, in addition, have substantially preserved its character as a 2-pole exciting winding.

An auxiliary dynamo-electric machine 7, which I will hereinafter designate as the exciter, is preferably rigidly connected to, and rotates with, the machine 1 through the medium of a shaft 8. The exciter 7 comprises a distributed armature winding 9 connected to commutator bars 10 and brushes 11—11 bearing upon the commutator bars. For purposes of illustration, I show a field winding 12 in simple diagrammatic relation to the armature winding of the exciter. It will be understood, however, that any number of poles may be established by this field winding, and my invention is, therefore, not limited to the specific method of excitation shown. Here, again, it will be observed that the number of brushes which bear upon the commutator bars of the machine 7 is equal to, or a multiple of, the number of tapped points 6 on the winding 4 of the machine 1, and, therefore, equal to, or a multiple of, the number of slip rings 5. Connections 13—13 extend between the slip rings 5 and the brushes 11.

Certain of the brushes 11 occupy such positions that they connect points of opposite potential in the armature winding 9 of the exciting machine 7 and, under operating conditions, therefore, furnish exciting current to the rotating field winding 4; while certain others of the brushes 11 connect points of substantially zero potential and are, therefore, in no way instrumental in affecting the exciting current which the machine 7 furnishes. They do, however, function in such manner, in connection with the equi-distant tapped connections 6, that a symmetrical polyphase path of very low impedance is provided for the flow of those currents which are set up in the rotating field winding by reason of the machine 1 furnishing unbalanced currents.

It is apparent, therefore, that I have combined in one machine an exciting function and a function which corresponds substantially to that which has heretofore been obtained by the use of a damper winding upon a dynamo-electric machine. My method of offering a path of perfect symmetry to the flow of the aforesaid circulating currents, by the simple connection of equi-distant tapped points to certain predetermined brushes upon the exciting machine, results in the accomplishment of the damping function with but slight increase in cost over the provision of dynamo-electric machine and an exciter, neither being provided with a damper winding.

While I have illustrated but one embodiment of my invention, it is apparent that many modifications therein may occur to those skilled in the art, and I desire, therefore, that my invention shall be construed broadly and be limited only by the scope of the appended claims, or by the disclosures of the prior art.

I claim as my invention:

1. The combination with a synchronous, alternating-current machine having symmetrical damper windings, of an exciter therefor, and an arrangement by which all of the polyphase components of the damping current traverse symmetrical paths afforded by said exciter.

2. The combination with a synchronous, alternating-current machine having symmetrical damper windings, of means for affording symmetrical paths of low impedance for polyphase currents induced in said damper windings, said means comprising an exciter machine having a plurality of symmetrically spaced brushes.

3. The combination with a synchronous polyphase machine having symmetrical damper windings, of an exciter therefor, said exciter including means for producing symmetrical, low-impedance paths through said exciter for polyphase currents induced in said damper windings.

4. The combination with a synchronous, alternating-current machine having an exciting field winding, of an auxiliary dynamo-electric machine for furnishing exciting current thereto, said auxiliary machine comprising a field member, an armature having a distributed winding, a commutator member associated with said armature winding, and brushes bearing on said commutator member, the number of said brushes being twice the number of poles in said auxiliary machine, and connections from each of said brushes to said exciting field winding for producing symmetrical, low-impedance paths for polyphase currents induced in said exciting field winding.

5. The combination with a synchronous, alternating-current machine having an exciting field winding, said winding having twice as many equi-spaced taps as there are poles on said machine, of an independent direct-current generator having two pairs of brushes, one of said pairs being located in the position of substantially maximum potential, and the other of said pairs being located in the position of substantially zero potential, and connections from all of said brushes to said equi-spaced taps.

6. The combination with a polyphase line subject to unbalanced conditions, of a dynamo-electric balancing machine having primary windings and symmetrical polyphase damper windings, said primary windings being connected to said polyphase line, and an exciter connected to said damper windings, said exciter including means for producing symmetrical, low-impedance paths through said exciter for polyphase currents induced in said damper windings.

7. The combination with a synchronous, alternating-current machine having polyphase damper windings, of an auxiliary dynamo-electric machine for furnishing exciting current thereto, said auxiliary machine comprising a field member, an armature having a distributed winding, a commutator member associated with said armature winding, and means including a plurality of brushes bearing on said commutator member for producing symmetrical, low-impedance paths for polyphase currents induced in said damper winding.

In testimony whereof, I have hereunto subscribed my name this 21st day of Mar. 1919.

CHARLES L. G. FORTESCUE.